United States Patent [19]

Shimada et al.

[11] Patent Number: 5,223,944
[45] Date of Patent: Jun. 29, 1993

[54] METHOD AND APPARATUS FOR TRANSMITTING VIDEO SIGNALS DURING FIRST AND SECOND PORTIONS THEREOF

[75] Inventors: Satoshi Shimada, Kanagawa; Jun Hirai, Tokyo, both of Japan

[73] Assignee: Sony Corporation, Tokyo, Japan

[21] Appl. No.: 442,620

[22] Filed: Nov. 29, 1989

[30] Foreign Application Priority Data

Dec. 8, 1988 [JP] Japan ................. 63-310668

[51] Int. Cl.⁵ .............................................. H04N 9/79
[52] U.S. Cl. ...................................... 358/330; 358/310
[58] Field of Search ............ 358/310, 330, 327, 325, 358/11, 12; 360/19.1, 33.1, 29, 30, 35.1

[56] References Cited

U.S. PATENT DOCUMENTS

| | | | |
|---|---|---|---|
| 4,604,655 | 8/1986 | Moriyama | 358/343 |
| 4,633,295 | 12/1986 | von de Polder et al. | 358/12 |
| 4,636,835 | 1/1987 | Tan et al. | 358/12 |
| 4,694,338 | 9/1987 | Tsinberg | 358/12 |
| 4,743,978 | 5/1988 | Tanaka | 358/310 |
| 4,792,862 | 12/1988 | Tsusue et al. | 358/330 |
| 4,805,035 | 2/1989 | Kawakami et al. | 358/310 |
| 4,961,112 | 10/1990 | Sugimori et al. | 358/140 |
| 4,984,078 | 1/1991 | Skinner et al. | 358/12 |

FOREIGN PATENT DOCUMENTS 1-258581 10/1989 Japan.
2112245 7/1983 United Kingdom ............. 358/12

Primary Examiner—Tommy P. Chin
Assistant Examiner—Thai Tran
Attorney, Agent, or Firm—Alvin Sinderbrand; William S. Frommer

[57] ABSTRACT

In transmitting, for example, by recording and reproducing, fields of video signals each having a core portion and side portions adjacent to such core portion and comprised of luminance and chrominance signals, the luminance signal which is desirably frequency modulated and the chrominance signal which is desirably frequency converted to a lower frequency band are combined and transmitted or recorded during the core portion of each field to provide a display of increased aspect ratio, and the chrominance signal is decoded into color difference signals which are time-compressed and then frequency modulated prior to being transmitted or recorded during the side portions of each field for enhancing the color of the displayed picture.

16 Claims, 3 Drawing Sheets

Picture Screen Having Aspect Ratio of 16:9

METHOD AND APPARATUS FOR TRANSMITTING VIDEO SIGNALS DURING FIRST AND SECOND PORTIONS THEREOF

BACKGROUND OF THE INVENTION

1. Field of the Invention

This invention relates generally to the transmitting of video signals, and more particularly is directed to video signal transmitting methods and apparatus suitable for application to video recording systems employing various types of record media, such as, magnetic tape, as in video tape recorders (VTRs), optical video disks, or magnetic disks for the recording of still pictures, and also suitable for application to video transmitting systems, such as, cable television (CATV) and wireless broadcasting systems.

2. Description of the Prior Art

High definition television (HDTV) broadcasting has been recently developed and, in connection therewith, it is desired to provide the appearance of a wide screen display by horizontally enlarging the aspect ratio of the picture screen from the existing 4:3 aspect ratio to a proposed 5:3 or 16:9 aspect ratio. Further, in the area of video tape recorders, the present trend is to increase the frequency band of the recorded luminance signal, for example, from 3 MHz to 5 or 6 MHz, as in the case of the existing 8 mm video tape recorders. Moreover, in the field of improved definition (ID) television broadcasting, it is now proposed to increase the vertical resolution by providing adaptive interpolation between adjacent fields or lines.

However, all of the above measures for improving the visual characteristics of a video picture have no bearing on the quality of the color thereof or of the associated audio or sound.

OBJECTS AND SUMMARY OF THE INVENTION

Accordingly, it is an object of the present invention to provide an improved method and apparatus for transmitting a video signal and by which the quality of the color of the corresponding video picture and/or of the associated audio can be improved.

More specifically, it is an object of the present invention to provide an improved method and apparatus for transmitting a video signal so as to provide the resulting display on the picture screen of a television receiver with an increased aspect ratio in the horizontal direction.

It is another object of the present invention to provide an improved method and apparatus for transmitting a video signal, as aforesaid, and by which an increased frequency band is available for the transmission of a carrier chrominance signal and/or an audio signal.

In accordance with an aspect of the present invention, a method of transmitting fields of video signals having a core portion and side portions adjacent to the core portion and being composed of a luminance signal and a chrominance signal, comprises the steps of transmitting the luminance signal and the chrominance signal during the core portion of the video signal in each of the fields, and transmitting additional related signals, such as, color-difference signals and/or audio signals, during the remaining side portions of the video signal in each of the fields.

In accordance with another aspect of the invention, a method of recording video signals comprised of luminance and chrominance signals and arranged in successive fields each having a core portion and side portions adjacent to the core portion, comprises the steps of frequency modulating the luminance signal during the core portion of each field, frequency converting the chrominance signal to a lower frequency band during the core portion of each field, adding together the frequency modulated luminance signal and frequency converted chrominance signal to provide a combined signal, recording the combined signal during the core portion of each field, decoding the chrominance signal so as to obtain color difference signals, time-compressing the color difference signals, frequency modulating the time-compressed color difference signals, and recording the frequency modulated, time-compressed color difference signals during the side portions of each field.

In accordance with still another aspect of this invention, a method of reproducing video signals recorded, as aforesaid, comprises reproducing the recorded combined signal and frequency modulated, time-compressed color difference signals to provide a reproduced signal, separating the frequency modulated luminance signal and the frequency converted chrominance signal from the combined signal in the reproduced signal, demodulating the separated frequency modulated luminance signal and the frequency modulated time-compressed color difference signals which constitute the reproduced signal during the side portions of each field, frequency reconverting the separated frequency converted chrominance signal, time-expanding the demodulated time-compressed color difference signals, and encoding the time-expanded color difference signals to reconstitute the chrominance signal.

In accordance with still another aspect of this invention, apparatus for transmitting fields of video signals having a core portion and side portions adjacent to the core portion and composed of a luminance signal and a chrominance signal, comprises a luminance signal input terminal for receiving the luminance signal, a chrominance signal input terminal for receiving the chrominance signal, frequency modulating means, frequency converting means for converting the chrominance signal to a lower frequency band, decoding means connected to the chrominance signal input terminal for decoding the chrominance signal to color difference signals, time-compressing means for time-compressing the color difference signals, first switching means connected to the luminance signal input terminal and the time-compressing means for selectively supplying the luminance signal and the output of the time-compressing means to the frequency modulating means, second switching means for supplying the chrominance signal from the respective input terminal to the frequency converting means, and adding means for adding the outputs of the frequency modulating means and the frequency converting means to form a transmitted signal which, for example, is supplied to a recording head, the first and second switching means being controlled so as to select the luminance signal and the chrominance signal, respectively, during the core portion of each field of the video signals and to select the output of the time-compressing means only during the side portions of each field.

In accordance with yet another aspect of this invention, an apparatus for reproducing video signals which have been recorded, as aforesaid, further comprises low pass filter means for separating the frequency converted chrominance signal from the output of a reproducing head, frequency reconverting means for reconverting the separated frequency converted chrominance signal to an original frequency band, a first chrominance signal output terminal connected with an output of the frequency reconverting means, high-pass filter means for separating the frequency modulated luminance signal from the output of the reproducing head, demodulating means connected with the high-pass filter means for demodulating the luminance signal separated by the latter from the output of the reproducing head, third switching means for selectively supplying the output of the reproducing head to the high-pass filter means and directly to the demodulating means, a luminance signal output terminal, time-expanding means, fourth switching means for selectively supplying the output of the demodulating means to the luminance signal output terminal and the time-expanding means, the third and fourth switching means being controlled so that, during the core portion of each field, the third and fourth switching means select the high-pass filter means and the luminance signal output terminal, respectively, and, during the side portions of each field, the third and fourth switching means select the demodulating means and the time-expanding means, respectively, a broadband chrominance signal output terminal, and encoder means connected between the time-expanding means and the broad-band chrominance signal output terminal for encoding time-expanded color difference signals received during the side portions of each field and reconstituting the chrominance signal therefrom.

The above, and other objects, features and advantages of the invention, will be apparent in the following detailed description of a preferred embodiment of the invention when read in conjunction with the accompanying drawings in which the same reference numerals are employed to identify corresponding parts in the several views.

DETAILED DESCRIPTION OF A PREFERRED EMBODIMENT

Figure 1A:
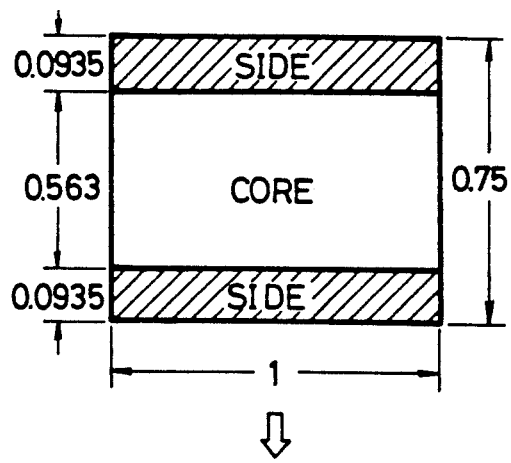
FIGS. 1A and 1B are schematic representations of video picture screens to which reference will be made in explaining a principle of the present invention.

Referring to the drawings in detail, and initially to FIG. 1A thereof, it will be seen that, in the case of the NTSC system, if the aspect ratio of the effective area of the picture screen is changed from the present standard aspect ratio of 4:3 to the aspect ratio 16:9, and the width of the effective area of the picture screen is assumed to be 1.0 in both instances, then the height of the effective area of the picture screen will be 0.75 for the aspect ratio of 4:3 and 0.563 for the aspect ratio of 16:9. In such case, the portion of the video signal corresponding to the display having the height 0.563 may be referred to as a core portion (CORE) of a field of the video signal.

Each such core portion of the video signal may be conventionally recorded on a record medium, for example, a magnetic tape, with the luminance signal of the video signal being frequency-modulated and the carrier chrominance signal of the video signal being frequency converted to a relatively lower frequency band, as in existing VTRs. However, the remaining portions of the video signal corresponding to the parts of the original picture screen appearing at the top and bottom of the core portion and each having a height of 0.0935, that is, ½ (0.75−0.563) are extraneous in the case of the wide picture screen having the aspect ratio of 16:9. Although such extraneous portions of the video signal appear at the top and bottom of the core portion in the illustration of the picture screen on FIG. 1A, such extraneous portions of the video signal occur at the opposite sides of the core portion in the line sequential video signal, and thus will be referred to as side portions (SIDE).

Generally, in accordance with an embodiment of this invention, the carrier chrominance signal of the video signal for the core portion CORE of each field is decoded to provide color difference signals $R-Y$ and $B-Y$, and these color difference signals $R-Y$ and $B-Y$ are time-compressed so as to be recordable on the magnetic tape or otherwise transmitted in lieu of the side portions SIDE. In the example shown on FIG. 1A, the time-compressing ratio for the color difference signals $R-Y$ and $B-Y$ would be 0.33, that is, 0.187/0.563, which is the ratio of the combined height of the parts of the screen corresponding to the side portions SIDE to the height of the part of the screen corresponding to the core portion CORE, in the line sequential scanning system. Thus, if the total transmission band is, for example, 5 MHz, a transmission band of 1.66 MHz is obtained for the color difference signals.

Since the video signal, or more properly a combined signal constituted by the frequency-modulated luminance signal and the low-frequency-converted chrominance signal, is recorded in a conventional manner in the core portion, and may be reproduced also in a conventional manner, the recording and reproducing, or other transmission of a video signal in accordance with the present invention, as generally described above, is compatible with existing systems. In the case of a television receiver or monitor having a picture screen with the presently standardized aspect ratio of 4:3, the parts of such picture screen identified as side portions SIDE and appearing at the top and bottom of the core portion CORE on FIG. 1A may be suitably masked so that the signal transmitted during such side portions of each field will not disturb the appearance of the displayed picture.

Figure 1B:
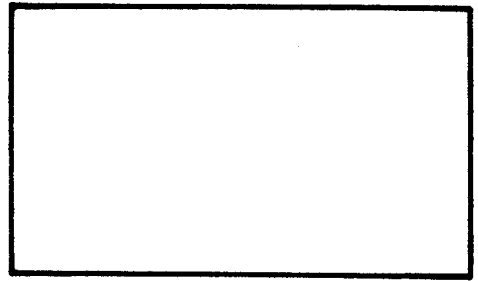

Further, with reference to the transmission of the color difference signals $R-Y$ and $B-Y$ during the side portions SIDE of each field, such color difference signals $R-Y$ and $B-Y$ may be alternated at every line or horizontal period H in the line-sequential system, or the color difference signals $R-Y$ and $B-Y$ may be both transmitted in each horizontal period, in which case the frequency band is divided in half. It is also possible to employ a combination of a field sequential system and the line sequential system. In such case, the order of the color difference signals $R-Y$ and $B-Y$ may be changed or reversed at every field so as to avoid deterioration of the vertical resolution of a still picture by the field interpolation. Furthermore, the frequency band of the color difference signals can be expanded to the vertical blanking portion of the video signal. In such case, a television picture tube may be provided with a horizontally expanded screen having an aspect ratio of 16:9, for example, as shown on FIG. 1B.

Figure 2:
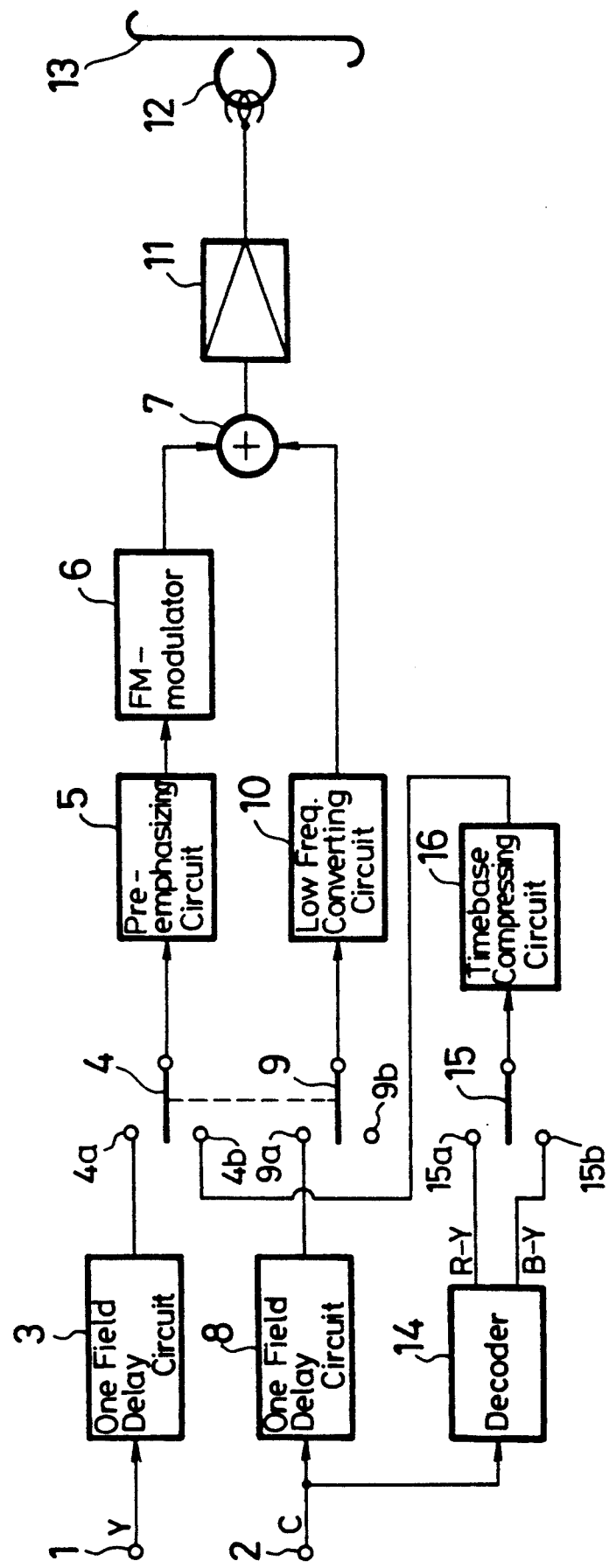
FIG. 2 is a block diagram of the recording section of a VTR according to an embodiment of the present invention.

The application of the present invention to a video tape recorder will now be more specifically described with reference to FIGS. 2 and 3 which respectively show the recording and reproducing sections thereof. It will be seen in FIG. 2 that a luminance signal Y and a carrier chrominance signal C, for example, from a camera, are supplied to input terminals 1 and 2, respectively. The luminance signal Y is supplied from the input terminal 1 to a delay circuit 3 having a delay time of one field. The thus delayed luminance signal is applied to a fixed contact 4a of a switching circuit 4 so that, when the latter is engaged with its contact 4a, the delayed luminance signal is supplied through switching circuit 4 to a pre-emphasizing circuit 5 in which its high band is suitably emphasized. The pre-emphasized luminance signal is supplied to a FM modulator 6 in which it is frequency-modulated and then applied to one input of an adder 7.

The carrier chrominance signal C is supplied from the input terminal 2 to a delay circuit 8 which also has a delay time of one field so that the carrier chrominance signal will coincide, in time, with the luminance signal issuing from the delay circuit 3. The delayed chrominance signal is supplied from the circuit 8 to a fixed contact 9a of a switching circuit 9 which, when it engages its contact 9a, supplies the delayed chrominance signal to a low frequency converting circuit 10 in which the chrominance signal is frequency-converted to a signal having a suitably low frequency, for example, 688 kHz in the case of the NTSC system. The resulting frequency converted chrominance signal is supplied to another input of the adder 7 so that the FM luminance signal from the modulator 6 and the low-frequency-converted carrier chrominance signal from the circuit 10 are mixed or combined in the adder 7. The mixed or combined signal obtained at the output of the adder 7 is supplied through a recording amplifier 11 to a magnetic head 12, for example of a VTR, for recording by the head 12 in a core portion of a slant track on a magnetic tape 13. The signal thus recorded on the tape 13 corresponds to a video signal representing the core portion of the picture screen shown on FIG. 1A, and is recorded in a conventional manner.

The carrier chrominance signal C applied to the input terminal 2 is also supplied therefrom to a decoder 14 in which the carrier chrominance signal is decoded to provide color difference signals R−Y and B−Y which are applied to fixed contacts 15a and 15b, respectively, of a switching circuit 15. The switching circuit 15 alternately engages its contacts 15a and 15b, for example, the switching circuit 15 is changed-over at every horizontal line period, so as to alternately supply the color-difference signals R−Y and B−Y to a time-base compressing circuit 16. Thus, the color difference signals R−Y and B−Y are time-compressed at every horizontal period in a line sequential manner by the circuit 16 which, for the previously described example, has a time-compressing ratio of 0.33. The resulting time-compressed color difference signals are supplied from the circuit 16 to another fixed contact 4b of the switching circuit 4 so that, when the latter is changed-over to engage its contact 4b, the time-compressed color difference signals R−Y and B−Y are supplied to the pre-emphasizing circuit 5 in which the high band thereof is emphasized, as previously described with reference to the luminance signal.

Further, the pre-emphasized color difference signals are supplied from the circuit 5 to the FM modulator 6, and the resulting frequency-modulated color difference signals from the modulator 6 are supplied through the adder 7 and the recording amplifier 11 to the head 12 for recording by the latter on the magnetic tape 13. The switching circuit 9 is operated in ganged relation with the switching circuit 4 so that, when the switching circuit 4 is made to engage its contact 4b, the switching circuit 9 disengages its contact 9a and engages an open contact 9b for interrupting the application of the carrier chrominance signal to the low-frequency-converting circuit 10.

It will be appreciated that the ganged switching circuits 4 and 9 are suitably operated to engage their respective fixed contacts 4a and 9a during the time in each field of the video signals corresponding to the core portion CORE of the picture screen, and the switching circuits 4 and 9 are changed-over to engage their respective fixed contacts 4b and 9b during the time in each field corresponding to the side portions SIDE of the picture screen. Thus, in applying the embodiment of the present invention shown in FIG. 2 to a VTR, the frequency modulated, time-compressed color difference signals are supplied to the magnetic head 12 for recording by the latter at end portions of the slant tracks on the magnetic tape 13 during the times in each field which correspond to the side portions SIDE, of the picture screen shown on FIG. 1A.

Figure 3:
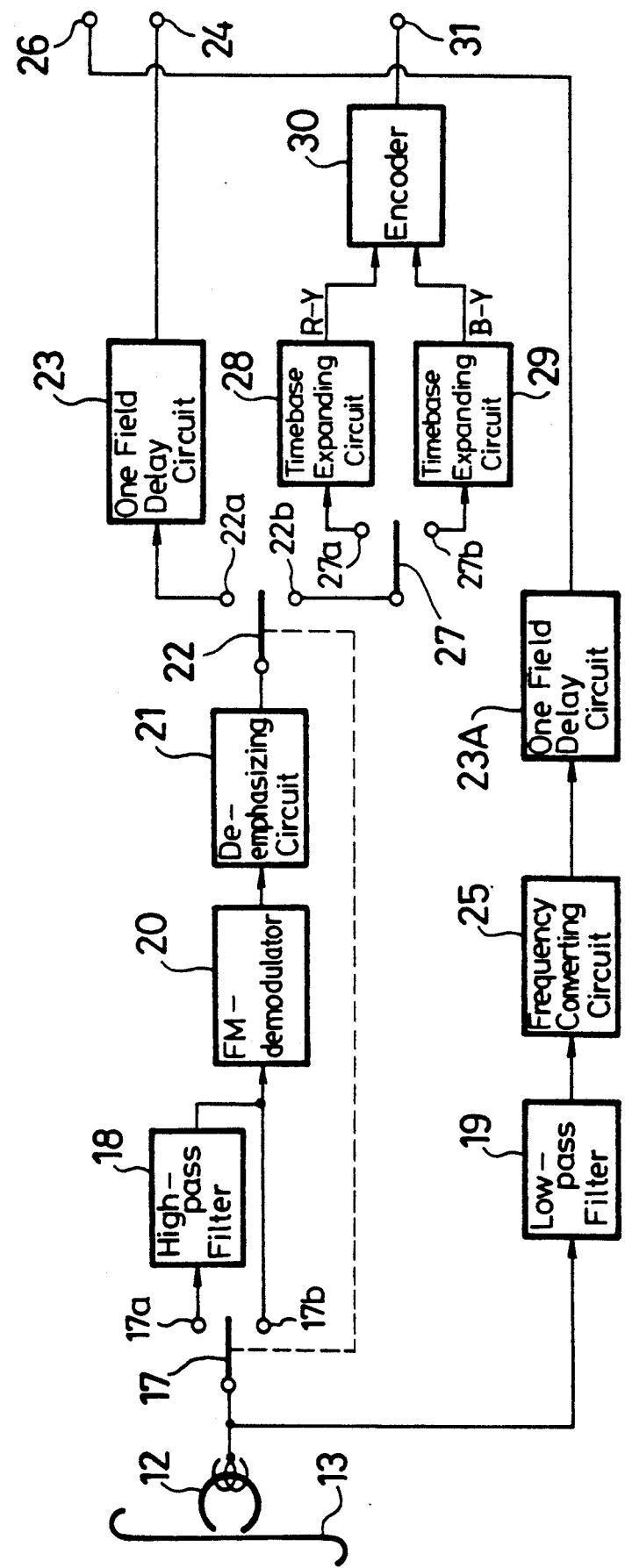
FIG. 3 is a block diagram of the reproducing section of the VTR having the recording section shown on FIG. 2.

The signal thus recorded on the magnetic tape 13 is reproduced by the circuit arrangement shown in FIG. 3, and in which the output of the magnetic head 12, when operating to reproduce the signal recorded on the tape 13, is applied to a switching circuit 17 which is suitably made to alternatively engage its fixed contacts 17a and 17b during the times when the head 12 is reproducing signals corresponding to the core portion CORE and the side portions SIDE, respectively. When the magnetic head 12 is scanning a recorded signal corresponding to the core portion CORE, the video signal reproduced from the magnetic tape 13 by the magnetic head 12 is supplied through the switching circuit 17 engaging its contact 17a to a high-pass filter 18 by which the FM luminance signal is separated therefrom and supplied to a frequency demodulator 20. The resulting demodulated luminance signal is supplied from the demodulator 20 through a de-emphasizing circuit 21 to a switching circuit 22 which is suitably operated in ganged relation with the switching circuit 17 for alternatively engaging fixed contacts 22a and 22b. Thus, when switching circuit 17 engages its fixed contact 17a for supplying the reproduced video signal corresponding to the core portion to the high-pass filter 18, the switching circuit 22 similarly engages its contact 22a for supplying the de-emphasized luminance signal through a delay circuit 23 having a delay time of one field to a reproduced luminance signal output terminal 24.

The output of the magnetic head 12 in its reproducing mode is also shown to be connected to a low pass filter 19 by which the low-frequency-converted carrier chrominance signal is separated from the video signal reproduced by the magnetic head 12 during the time corresponding to the core portion of each field. The low-frequency-converted chrominance signal obtained at the output of the low-pass filter 19 is supplied to a frequency converting circuit 25 in which the reproduced carrier chrominance signal is reconverted to its original carrier frequency, for example, to 3.58 MHz in the case of the NTSC system. The resulting carrier chrominance signal from the frequency converting circuit 25 is supplied through a delay circuit 23A having a delay time of one field to a carrier chrominance signal output terminal 26 so that the signals provided at the output terminals 24 and 26 represent the luminance signal and the carrier chrominance signal for the core portion of the picture screen shown on FIG. 1A.

On the other hand, during each time when the magnetic head 12 is scanning a portion of the magnetic tape 13 on which a signal corresponding to the side portions SIDE of the picture screen on FIG. 1A is recorded, the switching circuit 17 engages its fixed contact 17b with the result that the time-compressed, frequency modulated color difference signals then being reproduced by the head 12 are supplied to the frequency demodulator 20. The resulting demodulated time-compressed color difference signals are supplied through the de-emphasizing circuit 21 to the switching circuit 22 which, by reason of its gang relation with the switching circuit 17, engages its fixed contact 22b and thereby supplies the time-compressed color difference signals to a switching circuit 27 having fixed contacts 27a and 27b which are alternately engaged at the same change-over rate as is used for the switching circuit 15 in FIG. 2. In other words, the switching circuit 27 is suitably changed-over, for example, at every horizontal or line period, so that it engages the contacts 27a and 27b during the intervals when the time-compressed color difference signals R−Y and B−Y, respectively, are being supplied to the switching circuit 27. The contacts 27a and 27b are shown to be connected with time base-expanding circuits 28 and 29, respectively, which are thus operative to generate time-expanded color difference signals R−Y and B−Y, respectively. These color difference signals R−Y and B−Y are supplied from circuits 28 and 29 to an encoder 30 which produces therefrom a broad band carrier chrominance signal supplied to an output terminal 31.

Figure 4A:
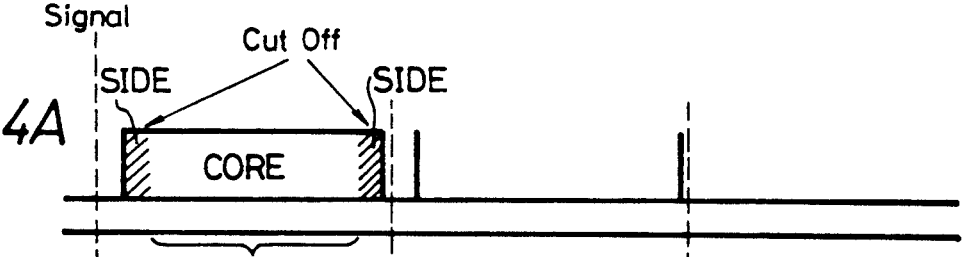
FIGS. 4A and 4B are schematic diagrams to which reference will be made in explaining the operation of the VTR of FIGS. 2 and 3.
Figure 4B:
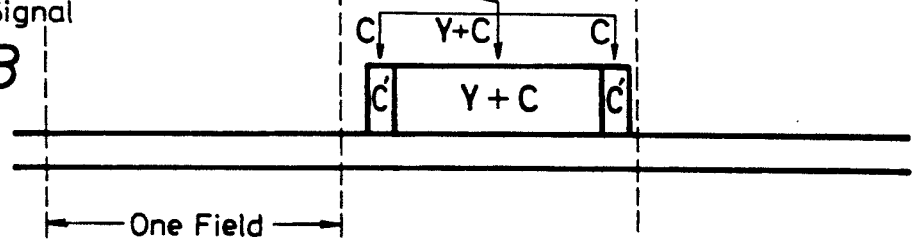

The relationship between an original video signal, for example, as delivered from a standard video camera, and represented on FIG. 4A, and a signal recorded on a magnetic tape in accordance with the present invention, and represented on FIG. 4B will now be further described. The side portions of each field of the original video signal are omitted, and the luminance signal Y and the carrier chrominance signal C are extracted from the video signal for the core portion CORE of FIG. 4A and are frequency modulated and low-frequency-converted, respectively, as is conventional, for recording on the portion of the magnetic tape corresponding to the core portion of a field of a picture to be reproduced therefrom. Further, the carrier chrominance signal C is extracted from the core portion of the original signal shown on FIG. 4A and is distributed and time-compressed for recording on portions of the magnetic tape corresponding to side portions of a field of the reproduced picture, as indicated at C' on FIG. 4B.

It will be appreciated that, in the embodiment of the present invention described above, when the video signal is recorded and/or reproduced so as to provide a horizontally-expanded aspect ratio to the corresponding displayed picture, the time-compressed carrier chrominance signal, for example, in the form of the color difference signals R−Y and B−Y, is recorded in and/or reproduced from portions of the tape which are along side the tape portion in which the video signal for the core portion of the picture with a horizontally-expanded aspect ratio is recorded. Therefore, the aspect ratio of the picture screen is expanded horizontally and, at the same time, the frequency band of the carrier chrominance signal is enlarged or improved.

In the above described embodiment of the invention, delay circuits, for example, in the form of field memories, are employed for delaying the signal for the core portion by one field relative to the signal for the side portions in order to match the timings of the luminance and carrier chrominance signals. However, similar matching of the timings of such signals, when recorded and reproduced in a helical scan VTR with rotary heads, can be achieved by employing separate heads for the core portions and the side portions which are at different heights, that is, different positions measured in the direction parallel to the axis of rotation of the rotary heads. Further, the carrier chrominance signal may be inserted into a vertical blanking period. Further, if a drop-out or excessive noise occurs in the side portions, the corresponding carrier chrominance signal may be replaced by the carrier chrominance signal of the core portion. Moreover, a color burst signal similar to that in the core portion may be inserted into the side portions. An ID (identification) signal may be added at the beginning of each side portion for identifying the latter as such and, in response to that ID signal, the output at the luminance signal output terminal 24 of the VTR may be muted for excluding side portion information therefrom.

Although the invention is described above as being applied to a video tape recorder (VTR), it is to be appreciated that the invention is not limited thereto and may also be applied to the recording of video on other media, such as, optical video disks, and magnetic disks for still pictures (MAVICA, trademark) and the like. Further, the present invention can be suitably employed in video transmitting systems, such as, cable television systems (CATV) and wireless broadcasting systems, in which case, a color subcarrier according to the NTSC system may be inserted into the interval of the core portion.

Furthermore, when it is deemed more important to improve the quality of the recorded and reproduced, or otherwise transmitted sound rather than enhancing the color of the displayed picture, the core portion is again utilized for conventionally recording the color video signal, and the side portions are utilized as intervals in which a pulse code modulated (PCM) audio signal is recorded or transmitted. Such recording of the audio signal in the side portions for improving the quality of the reproduced sound is particularly advantageous in the case of video disks.

Since the signal recorded and reproduced or transmitted in accordance with the present invention is to be displayed by a television receiver having a horizontally expanded picture screen with the aspect ratio of 16:9, the recorded or transmitted signal desirably includes an ID signal which indicates whether the signal arriving at the television receiver has a 4:3 aspect ratio or a 16:9 aspect ratio, whereupon the deflection system and/or the signal processing system of the television receiver is automatically switched in response to the detected ID signal so as to accommodate the respective aspect ratio.

By way of summary, it is noted that, in accordance with the present invention, when a video signal is recorded or transmitted so as to have an aspect ratio that is different from the standard aspect ratio, the carrier chrominance signal or the audio signal is time base-compressed and recorded or transmitted in intervals corresponding to omitted side portions adjacent to a core portion of each field of the video signal which is to be displayed with the different aspect ratio, whereby the picture screen can be horizontally expanded and the frequency band of the carrier chrominance signal or of the audio signal can be improved or widened.

Although a preferred embodiment of the invention has been described in detail herein with reference to the accompanying drawings, it is to be understood that the present invention is not limited to that precise embodiment, and that many changes and modifications can be effected therein by one skilled in the art without departing from the scope or spirit of the invention as defined in the appended claims.

What is claimed is:

1. A method of transmitting fields of a video signal having a first portion corresponding with a first picture area and a second portion corresponding with a second picture area adjacent to said first picture area, said video signal being comprised of a luminance signal and a chrominance signal, said method comprising the steps of:

frequency modulating said luminance signal to provide a frequency modulated luminance signal;

converting said chrominance signal to a lower frequency band to provide a low frequency converted chrominance signal;

transmitting said frequency modulated luminance signal and said low frequency converted chrominance signal during said first portion of said video signal in each of said fields; and transmitting additional related signals during said second portion of said video signal in each of said fields.

2. The method according to claim 1; in which said additional related signals include color information of said video signal.

3. The method according to claim 2; in which said additional related signals include color difference signals; and further comprising time-compressing said color difference signals to be coextensive with said second portion.

4. The method according to claim 3; in which said color difference signals are R−Y and B−Y signals, respectively.

5. The method according to claim 1; in which said additional related signals are audio signals.

6. The method according to claim 5; in which said audio signals are time-compressed digital audio signals.

7. A method of recording video signals comprised of luminance and chrominance signals and arranged in successive fields each having a first portion corresponding with a first picture area and a second portion corresponding with a second picture area adjacent to said first picture area, said method comprising the steps of:

frequency modulating said luminance signal during said first portion of each of said fields;

frequency converting said chrominance signal to a lower frequency band during said first portion of each of said fields;

adding together the frequency modulated luminance signal and the frequency converted chrominance signal to provide a combined signal;

recording said combined signal during said first portion of each of said fields;

decoding said chrominance signal to color difference signals;

time-compressing said color difference signals;

frequency modulating the time-compressed color difference signals; and recording the frequency modulated, time-compressed color difference signals during said second portion of each of said fields.

8. A method of recording and reproducing a video signal comprised of luminance and chrominance signals and arranged in successive fields each having a first portion corresponding with a first picture area and a second portion corresponding with a second picture area adjacent the said first picture area, said method comprising the steps of:

frequency modulating said luminance signal during said first portion of each of said fields, frequency converting said chrominance signal to a lower frequency band during said first portion of each of said fields, adding together the frequency modulated luminance signal and the frequency converted chrominance signal to provide a combined signal, decoding said chrominance signal to color difference signals, time-compressing said color difference signals, frequency modulating the time-compressed color difference signals, and recording said combined signal and the frequency modulated, time-compressed color difference signals during said first portion and second portion, respectively; and reproducing the recorded combined signal and frequency modulated, time-compressed color difference signals to provide a reproduced signal, separating the frequency modulated luminance signal and the frequency converted chrominance signal from said combined signal in the reproduced signal, demodulating the separated frequency modulated luminance signal, demodulating the frequency modulated time-compressed color difference signals constituting said reproduced signal during the second portion of each field, frequency reconverting the separated frequency converted chrominance signal, ·time-expanding the demodulated time-compressed color difference signals, and encoding the time-expanded color difference signals to reconstitute the chrominance signal.

9. Apparatus for transmitting fields of video signals each having a first portion corresponding with a first picture area and a second portion corresponding with a second picture area adjacent to said first picture area, said video signals being comprised of a luminance signal and a chrominance signal, said apparatus comprising:

a luminance signal input terminal for receiving the luminance signal;

a chrominance signal input terminal for receiving the chrominance signal;

frequency modulating means for frequency modulating an input signal received at an input thereof;

frequency converting means for converting the chrominance signal to a lower frequency band;

decoding means coupled with said chrominance signal input terminal for decoding said chrominance signal to color difference signals;

time-compressing means for time-compressing said color difference signals;

first switching means for selectively supplying said luminance signal and the time-compressed color difference signals to the input of said frequency modulating means;

second switching means for supplying said chrominance signal received by said chrominance signal input terminal to said frequency converting means; and adding means for adding the outputs of said frequency modulating means and said frequency converting means so as to provide a transmitted signal therefrom, said first and second switching means being controlled so as to select said luminance signal and said chrominance signal, respectively, during the first portion of each field of said video signals, said first switching means being controlled to select the time-compressed color difference signals during the second portion of each field of said video signals.

10. Apparatus for transmitting fields of video signals having a first portion corresponding with a first picture area and a second portion corresponding with a second picture area adjacent to said first picture area, said video signals being comprised of a luminance signal and a chrominance signal, said apparatus comprising:

a luminance signal input terminal for receiving the luminance signal;

a chrominance signal input terminal for receiving the chrominance signal;

frequency modulating means for frequency modulating an input signal received at an input thereof;

frequency converting means for converting the chrominance signal to a lower frequency band;

decoding means for decoding said chrominance signal to color difference signals;

time-compressing means for time-compressing said color difference signals;

delay means for delaying said luminance signal and said chrominance signal;

first switching means for selectively supplying the delayed luminance signal from said delay means and the time-compressed color difference signals from said time-compressing means to the input of said frequency modulating means;

second switching means for supplying the delayed chrominance signal from the delay means to said frequency converting means; and adding means for adding the outputs of said frequency modulating means and said frequency converting means so as to provide a transmitted signal therefrom, said first and second switching means being controlled so as to select the delayed luminance and chrominance signals, respectively, during the first portion of each field of said video signals, said first switching means being controlled so as to select the time-compressed color difference signals only during the second portion of each field of said video signals.

11. Apparatus according to claim 10; further comprising pre-emphasis means for carrying out preemphasis of the luminance signal and time-compressed color difference signals supplied to said frequency modulating means.

12. Apparatus according to claim 11; further comprising head means coupled with an output of said adding means for recording said transmitted signal on a record medium.

13. Apparatus according to claim 12; in which said head means is also operative to reproduce said transmitted signal from said record medium; and further comprising low pass filter means for separating the frequency converted chrominance signal from the reproduced transmitted signal;

frequency reconverting means for reconverting the separated frequency converted chrominance signal to an original frequency band to produce a first output chrominance signal;

a first chrominance signal output terminal coupled with said frequency reconverting means to provide said first output chrominance signal;

high pass filter means for separating the frequency modulated luminance signal from the reproduced transmitted signal;

demodulating means for selectively demodulating one of the reproduced transmitted signal and the luminance signal separated by the high pass filter means from the reproduced transmitted signal;

a luminance signal output terminal;

time-expanding means for time expanding an input signal received at an input thereof;

third switching means coupled with said demodulating means for selectively supplying the output of said demodulating means to said luminance signal output terminal and to the input of said time-expanding means;

said third switching means being controlled so that, during the first portion of each field of the video signals, said third switching means selects said said luminance signal output terminal and, during said second portion of each said field, said third switching means selects said time-expanding means;

a broad-band chrominance signal output terminal; and encoder means coupled between said time-expanding means and said broad-band chrominance signal output terminal for encoding time-expanded color difference signals received during said second portion of each field and reconstituting the chrominance signal therefrom, said encoder means being operative to supply the reconstituted chrominance signal to said broadband chrominance signal output terminal.

14. A method according to claim 7, wherein the first portion of each successive field of said video signal corresponds with a first area of a picture including a vertical center thereof, each successive field of said video signal including a third portion, said second and third portions corresponding with respective areas of said picture each located adjacent to and respectively above and below said first area, and further comprising the step of recording additional related signals during said third portion of each of said fields.

15. A method according to claim 8, wherein the first portion of each successive field of said video signal corresponds with a first area of a picture including a vertical center thereof, each successive field of said video signal including a third portion, said second and third portions corresponding with respective areas of said picture each located adjacent to and respectively above and below said first area, and further comprising the steps of recording additional related signals during said third portion of each of said fields and reproducing the additional related signals.

16. The apparatus according to claim 9, wherein the first portion of each successive field of said video signal corresponds with a first area of a picture including a vertical center thereof, each successive field of said video signal including a third portion, said second and third portions corresponding with respective areas of said picture each located adjacent to and respectively above and below said first area, and wherein the first switching means is controlled to select the time-compressed color difference signals during the third portion of each field of said video signals.

* * * * *